United States Patent [19]

Omata et al.

[11] 4,402,801
[45] Sep. 6, 1983

[54] METHOD FOR MANUFACTURING THIN FILM MAGNETIC HEAD

[75] Inventors: Yuji Omata, Ibaraki; Nobuyuki Kaminaka; Kenji Kanai, both of Neyagawa; Noboru Nomura, Kyoto, all of Japan

[73] Assignee: Matsushita Electric Industrial Co., Ltd., Osaka, Japan

[21] Appl. No.: 405,059

[22] Filed: Aug. 4, 1982

[30] Foreign Application Priority Data

Aug. 4, 1981 [JP] Japan .................... 56-121423

[51] Int. Cl.$^3$ .................................... C25D 5/02
[52] U.S. Cl. ............................ 204/15; 204/38 R; 204/38 B
[58] Field of Search ............... 204/15, 38 B, 38 R

[56] References Cited

U.S. PATENT DOCUMENTS

| | | | |
|---|---|---|---|
| 3,317,408 | 5/1967 | Barnes | 204/15 |
| 3,520,782 | 7/1970 | Carbonel | 204/15 |
| 3,764,486 | 10/1973 | Tinklenberg | 204/15 |

*Primary Examiner*—T. M Tufariello
*Attorney, Agent, or Firm*—Burgess, Ryan and Wayne

[57] ABSTRACT

The invention provides a method for manufacturing a thin film magnetic head with a low step structure having a first nonmagnetic insulating layer, a lower magnetic layer, a nonmagnetic insulating layer of a thickness corresponding to a gap length, a second nonmagnetic insulating layer, a conductive layer which constitutes a coil, a third nonmagnetic insulating layer, and an upper magnetic layer, each of which is sequentially formed on a nonmagnetic conductive substrate in the order named. A conductive layer is formed in a recess whose bottom surface corresponds to an exposed upper surface of the nonmagnetic conductive substrate and which is formed in a predetermined portion of the first nonmagnetic insulating layer formed on the nonmagnetic conductive substrate. Thereafter, electroplating is performed to form a yoke portion of the lower magnetic layer in the recess by applying a voltage to the conductive layer as an electrode through the nonmagnetic conductive substrate. Further, a magnetic layer of a predetermined thickness is formed on the yoke portion and in its vicinity to increase the thickness of the yoke.

6 Claims, 2 Drawing Figures

METHOD FOR MANUFACTURING THIN FILM MAGNETIC HEAD

BACKGROUND OF THE INVENTION

The present invention relates to a method for manufacturing a thin film magnetic head with a low step structure.

In thin film magnetic heads, a magnetic efficiency is generally improved by increasing the thickness of a lower magnetic layer of a yoke portion. However, when the thickness of the lower magnetic layer on a flat substrate is increased, the yoke portion is mounded. Further, various thin films are formed on the mound, so that a step is formed between the mound and its surrounding portion. Poor step coverage results in disconnections of a coil portion, improper masking, and other various drawbacks. In order to solve the above drawbacks, thin film magnetic heads with a low step structure have been developed.

In the thin film magnetic head of this type, a recess is formed in a predetermined portion of a nonmagnetic insulating layer on a substrate. The yoke portion of an increased thickness is formed in the recess. As a result, the yoke portion may not be mounded, thus solving the problem of poor step coverage and any other manufacturing problem.

SUMMARY OF THE INVENTION

It is, therefore, an object of the present invention to provide a method for manufacturing a thin film magnetic head having a low step structure with high yield.

According to the present invention, a nonmangnetic insulating film is formed on a nonmagnetic conductive substrate, and a recess with a bottom surface corresponding to an upper surface of the nonmagnetic conductive substrate is formed in a predetermined portion of the nonmagnetic insulating layer. Thereafter, a conductive layer is formed on the bottom surface of the recess. The conductive layer which is defined as an electrode, is electroplated by application of a voltage through the nonmagnetic conductive substrate to form in the recess a yoke portion of a lower magnetic layer. A magnetic layer of a predetermined thickness is formed on the yoke portion and in its vicinity. As a result, a lower magnetic layer is formed having an increased thickness at the yoke portion.

As described above, a low step structure is obtained. Further, since the thickness of the yoke portion is increased, magnetic efficiency is improved. In addition to this, film formation defects resulting from the step when various thin films are formed on the lower magnetic layer are eliminated. As a result, high yield is guaranteed.

Other objects, features and advantages of the present invention will be apparent from the following detailed description when taken in conjunction with the accompanying drawings.

DETAILED DESCRIPTION OF THE PREFERRED EMBODIMENT

Figure 1:
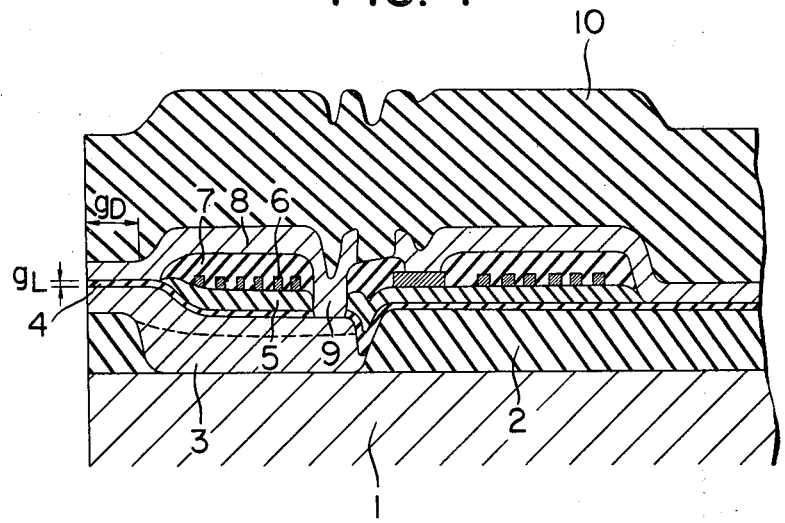
FIG. 1 is a sectional view showing the fundamental structure of a thin film magnetic head with a low step structure to which the present invention is applied.

FIG. 1 shows the fundamental structure of a thin film magnetic head with a low step structure. A recess is formed in a predetermined portion of a first nonmagnetic insulating layer 2 which is formed on a substrate 1. A lower magnetic layer 3 is formed in the recess and in its vicinity, and a nonmagnetic insulating layer 4 is formed thereon to provide a gap of length $g_L$. A second nonmagnetic insulating layer 5, a conductive layer 6 which constitutes a coil portion, and a third nonmagnetic insulating layer 7 are formed on the nonmagnetic insulating layer 4 in the order named. An upper magnetic layer 8 is formed on the third nonmagnetic insulating layer 7 and contacts the lower magnetic layer 3 at a back-gap portion 9. A protective layer 10 is formed as the uppermost layer to protect the main thin film portion. As shown in FIG. 1, since the lower magnetic layer 3 is formed in the recess of the first nonmagnetic insulating layer 2, no step may be formed in the subsequent thin film formation process. In other words, the step due to the total thickness of the second nonmagnetic insulating layer 5 and the conductive layer 6 is greatly decreased. As a result, excellent magnetic efficiency is achieved. Further, good film formation is provided in the manufacturing process.

Figure 2A:
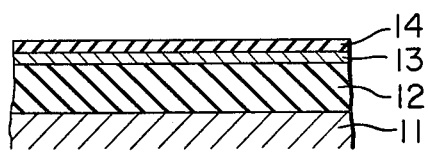
FIGS. 2A to 2D are sectional views for explaining the steps of forming a lower magnetic layer according to the present invention.
Figure 2B:
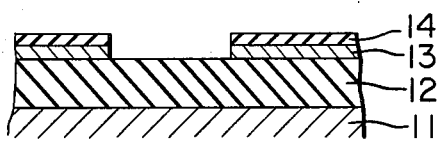
Figure 2C:
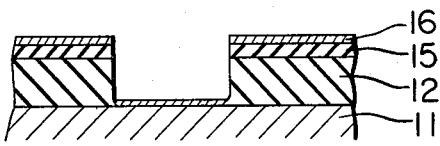
Figure 2D:
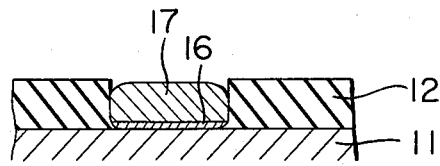

A method for manufacturing the thin film magnetic head having a low step structure according to the present invention will be described with reference to FIGS. 2A to 2D. FIGS. 2A to 2D show the steps of forming a lower magnetic layer and its vicinity. Referring to FIG. 2A, reference numeral 11 denotes a nonmagnetic conductive substrate which comprises a single material having a small conductivity or a sintered body including a structure of conductive material such as $Al_2O_3$-TiC. The nonmagnetic conductive substrate 11 must be a material having an abrasion resistance to a recording medium. A first magnetic insulating layer 12 of $SiO_2$, $Al_2O_3$ or the like is deposited by sputtering, and an aluminum deposition layer 13 as a thin mask layer is formed by vacuum deposition to a thickness of 500 to 1,000 Å. The aluminum deposition film 13 functions to minimize overetching of the recess in the nonmagnetic insulating layer 12 when the recess is formed by etching in an atmosphere of an $C_XF_Y$ gas plasma. The aluminum deposition layer 13 may not be substantially etched in the above atmosphere, even over a long period of time. A positive type photoresist layer 14 is deposited on the aluminum deposition layer 13 and is etched so that photoresist patterns are formed. Using the photoresist patterns as masks, the aluminum deposition layer 13 is etched by an aluminum etchant, so that the surface of the nonmagnetic insulating layer 12 is exposed, as shown in FIG. 2B. The exposed portion of the nonmagnetic insulating layer 12 is then dry etched by an $C_XF_Y$ gas plasma to form the recess. The remaining portion of the aluminum deposition layer 13 is etched by the etchant. After a photoresist film 15 is formed on the nonmagnetic insulating layer 12 except for an opening corresponding to the recess, a conductive layer 16 of an Ni-Fe alloy is deposited by sputtering or vacuum deposition, as shown in FIG. 2C. The portions of the conductive layer 16 which are formed on the photoresist pattern are removed by the lift-off method. The remaining conductive layer portion in the recess is used as the electrode. As shown in FIG. 2D, a lower magnetic layer 17 is then electroplated onto the conductive layer 16. If a substrate including Al$_2$O$_3$-TiC conductive structure is used, a plated layer is only formed on the TiC structure when electroplating is directly performed using the exposed portion of the substrate as the electrode. As a result, the plated film may have a three-dimensional surface and is not suitable as the magnetic layer. Since a material having a conductive component or a material having a small specific resistance is used as a substrate, the lower magnetic layer 17 can be formed only in the recess even if an electrolysis voltage is arbitrarily applied across the exposed portions of the substrate, only if the electrolyte is insulated from the voltage. The potential profile on the substrate surface becomes uniform, so that a uniform film thickness is obtained within the area of the substrate surface, and the plating process can also be simplified.

After the lower magnetic layer 17 is formed, in order to form a pole piece portion in the vicinity of the pattern as shown in FIG. 1 and to increase the thickness of the yoke portion in the recess, another conductive layer is deposited in the same manner as in FIG. 2, and electroplating is performed for the second time. Alternatively, only the pole piece portion is deposited by sputtering. Thereafter, the nonmagnetic insulating layer 4 which comprises SiO$_2$ or Al$_2$O$_3$ and which has a thickness corresponding to the gap length g$_L$ is deposited by sputtering on the lower magnetic layer 3. Part of the lower magnetic layer 3 at the back-gap portion 9 is exposed by etching. The second nonmagnetic insulating layer 5 is formed using a positive type photoresist pattern. The conductive layer 6 which constitutes the coil portion is formed on the second nonmagnetic insulating layer 5 by electroplating. The third nonmagnetic insulating layer 7 sandwiching the coil portion between itself and the second nonmagnetic insulating layer 5, is formed in the same manner as the second nonmagnetic insulating layer 5. These nonmagnetic insulating layers on the lower magnetic layer can be formed in accordance with the conventional manufacturing process, so that a detailed description thereof will be omitted. The upper magnetic layer 8 is formed by plating, vacuum deposition or sputtering. The upper magnetic layer 8 contacts the lower magnetic layer 3 at the back-gap portion 9. The protective layer 10 of SiO$_2$, Al$_2$O$_3$, SiC or the like can be deposited by sputtering on the upper conductive layer 8. After the thin film portion is formed, the thin film magnetic head is cut and polished so as to obtain a predetermined gap depth g$_D$ at a surface which contacts the magnetic medium.

According to the present invention, the following effects are obtained:

(1) Since a low step structure can be obtained, magnetic efficiency is improved. Further, film formation defects due to poor step coverage can be eliminated, thus providing high yield.

(2) since the aluminum deposition layer 13 is formed as a thin mask film in order to form the recess in the nonmagnetic insulating layer 2, the recess can be formed by plasma etching with high precision.

(3) Since a voltage can be applied to any exposed portion of the side and lower surfaces of the substrate when the lower magnetic layer is formed by electroplating in the recess, the plated layer can be uniformly formed. Further, a plating method can be simplified.

(4) The plated layer can be formed by electroplating in the recess, regardless of the type of substrate, if the substrate has a specific resistance below about 10$^5$ Ω.cm, in other words, if the substrate has a conductivity higher than that of semiconductor.

What is claimed is:

1. A method for manufacturing a thin film magnetic head having a first nonmagnetic insulating layer, a lower magnetic layer, a nonmagnetic insulating layer of a thickness corresponding to a gap length, a second nonmagnetic insulating layer, a conductive layer which constitutes a coil, a third nonmagnetic insulating layer, and an upper magnetic layer, each of which is sequentially formed on a nonmagnetic conductive substrate in the order named, comprising the steps of:

(a) forming said first nonmagnetic insulating layer on said nonmagnetic conductive substrate, forming a recess whose bottom surface corresponds to an upper surface of said nonmagnetic conductive substrate, and forming an electrode conductive layer in said recess;

(b) performing electroplating to form a yoke portion of said lower magnetic layer in said recess by using said electrode conductive layer as an electrode and by applying a voltage to a portion, excluding a thin film formation surface, of said nonmagnetic conductive substrate; and (c) forming a magnetic layer of a predetermined thickness on said yoke portion and in the vicinity thereof, so that said magnetic layer of a predetermined thickness causes a thickness of said yoke portion to increase, and that said magnetic layer of a predetermined thickness comprises in the vicinity of said yoke portion a distal end pole piece portion of said lower magnetic layer.

2. A method according to claim 1, wherein said nonmagnetic conductive substrate comprises a single material having a specific resistance of not more than 10$^5$ Ω.cm.

3. A method according to claim 1, wherein said nonmagnetic conductive substrate comprises a sintered material including a conductive structure.

4. A method according to claim 3, wherein said sintered material comprises Al$_2$O$_3$-TiC.

5. A method according to claim 1, wherein step (a) includes the steps of performing a relatively thin mask pattern formation layer on said first nonmagnetic insulating layer, forming a photoresist pattern on said relatively thin mask pattern formation layer, etching said relatively thin mask pattern formation layer to form a mask pattern using said photoresist pattern as a mask, forming said recess in said first nonmagnetic insulating layer using said photoresist pattern and said mask pattern as masks, forming an electrode conductive layer at least in said recess and in the vicinity thereof, and selectively etching said electrode conductive layer on said photoresist pattern and on said mask pattern to leave said electrode conductive layer only in said recess.

6. A method according to claim 5, wherein said relatively thin mask pattern formation layer comprises a thin aluminum film, and said electrode conductive layer comprises a thin Ni-Fe alloy film.

* * * * *